W. H. BUCKINGHAM & H. S. JOHNSON.
RAILWAY TRUCK AND DRIVE THEREFOR.
APPLICATION FILED MAR. 4, 1916.
1,216,063.
Patented Feb. 13, 1917.
2 SHEETS—SHEET 2.
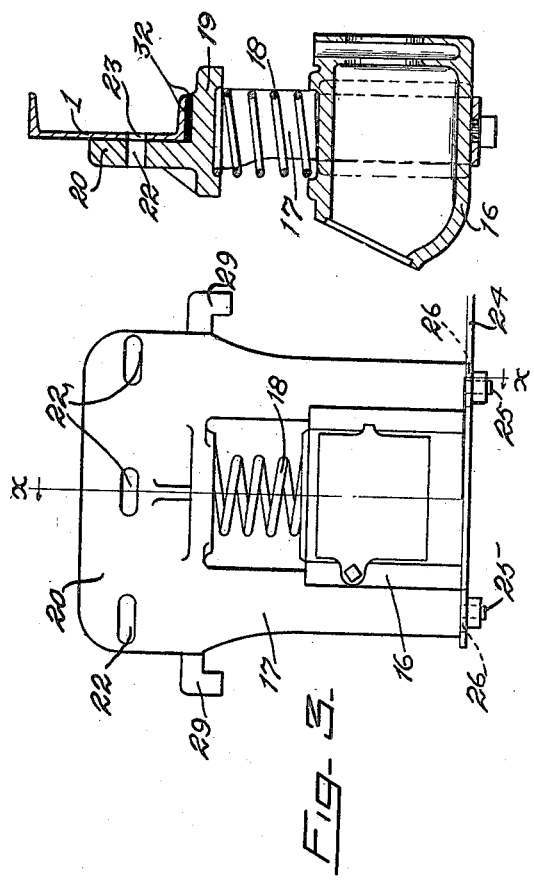
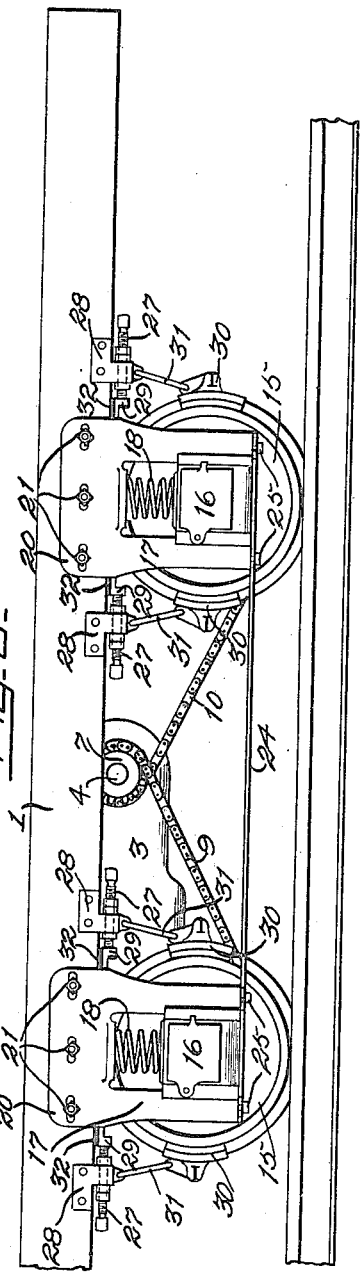
WITNESS
INVENTORS.
W. H. Buckingham
H. S. Johnson
BY
Acker, Totten
their ATTORNEYS.

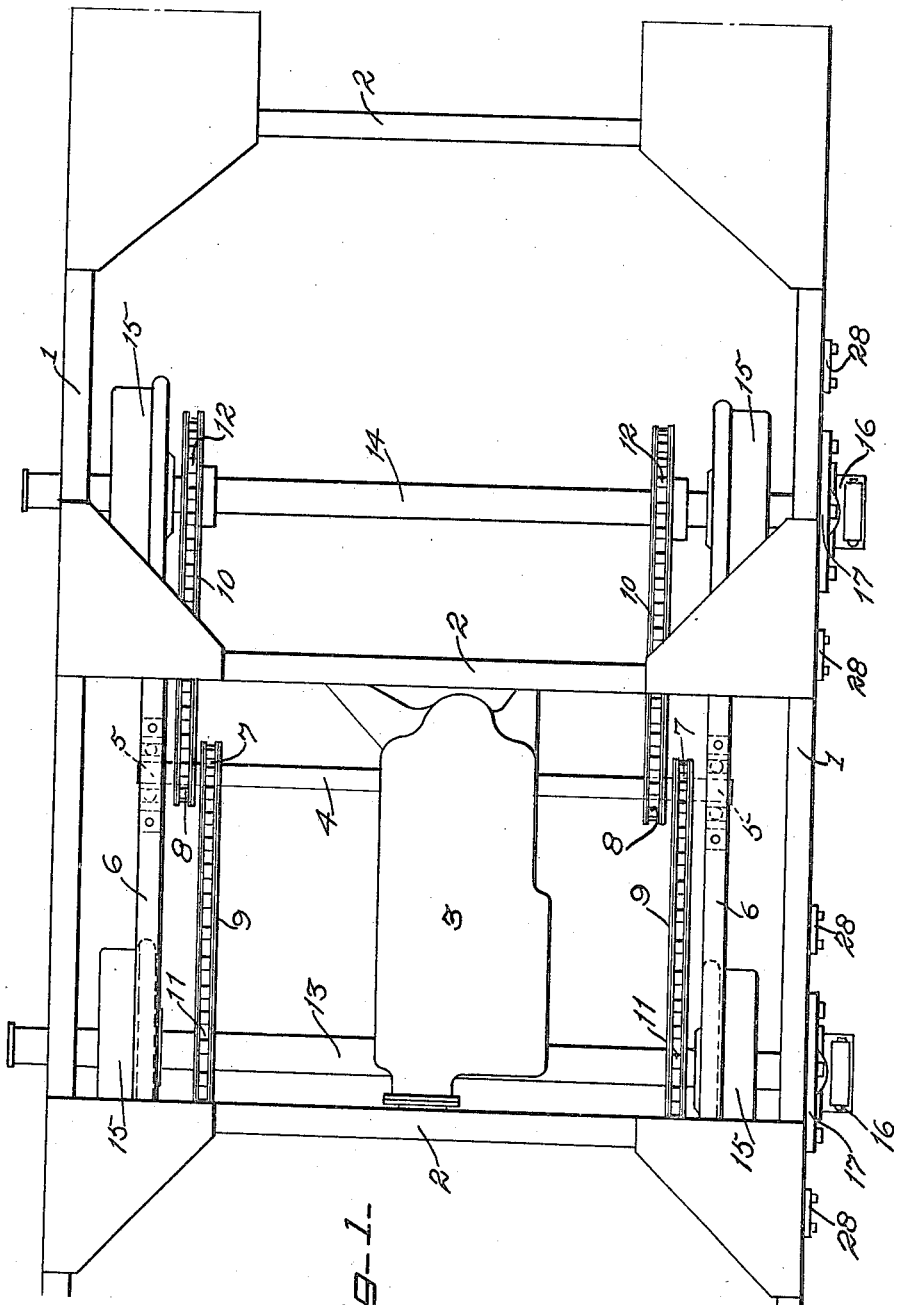

UNITED STATES PATENT OFFICE.

WILLIAM H. BUCKINGHAM, OF SAN FRANCISCO, AND HAROLD S. JOHNSON, OF MILL VALLEY, CALIFORNIA, ASSIGNORS TO HERCULES MOTOR PATENTS INC., OF SAN FRANCISCO, CALIFORNIA, A CORPORATION OF CALIFORNIA.

RAILWAY-TRUCK AND DRIVE THEREFOR.

1,216,063.  Specification of Letters Patent.  Patented Feb. 13, 1917.

Application filed March 4, 1916. Serial No. 82,129.

*To all whom it may concern:*

Be it known that we, WILLIAM H. BUCKINGHAM and HAROLD S. JOHNSON, citizens of the United States, residing, the said BUCKINGHAM in the city and county of San Francisco and State of California, and the said JOHNSON at Mill Valley, county of Marin, State of California, have invented certain new and useful Improvements in Railway-Trucks and Drives Therefor, of which the following is a specification.

The present invention relates to a driving and weight supporting truck for railway cars, and more particularly to a truck wherein is provided adjusting means to compensate for wear in the driving mechanism.

The object of the invention is to provide a truck of the type described for use in connection with self-propelled railway cars. In such cars, particularly those in which an internal combustion engine is used to supply the driving power, it is highly desirable to mount the engine upon the frame of the car, rather than upon the truck, partly to relieve the engine from the excessive jarring of the truck, but mainly in order to obtain sufficient room and ample support for the engine, without making the truck unduly large and unwieldy. In such cases it is necessary to provide flexible power-transmitting connections between the engine and the driving wheels, to permit the usual spring movement.

In order to comprehend the invention, reference should be had to the accompanying sheets of drawings, wherein—

Figure 1 is a plan view of the car truck, and a portion of the frame.

Fig. 2 is a side elevation of the same.

Fig. 3 is a detailed side elevation, enlarged, of one of the adjustable pedestals with its journal box.

Fig. 4 is a vertical section taken in the direction of the arrows on the line *x—x* of Fig. 3, showing in addition thereto a side member of the frame in section.

In the drawings, and referring particularly to Figs. 1 and 2 thereof, the numeral 1 designates the side rails of a suitably constructed frame, which may be either the main frame of the car, as in the present case, or the frame of one truck thereof. Supported upon transverse frame members 2 is a case 3, within which are suitable gears or other means not shown, for transmitting the driving power from an engine, not shown, to a transverse sprocket shaft 4, suitably journaled at or near its center in the gear case 3, and at its ends in bearings 5 supported by auxiliary frame members 6 carried by the main frame.

The transverse shaft 4 carries, near each end, a pair of sprockets 7 and 8 which are respectively connected, by means of chains 9 and 10, to sprockets 11 and 12 fixed upon the axles 13 and 14. Said axles, except for the presence thereon of the sprockets 11 and 12, are of the usual railway type, carrying the rail-running wheels 15, and being suitably journaled in boxes 16, mounted in the customary manner for vertical sliding movement in the pedestals 17, said pedestals 17 being supported from said journal boxes 16 by suitable springs 18.

The pedestals 17 are each provided with a horizontal flange 19, Fig. 4 of the drawings, forming a seat upon which rests the side rail 1 of the frame, and also an upright flange 20 which lies against the face of said frame rail 1 and is secured thereto by means of bolts 21, Fig. 2 of the drawings, extending through holes 22 and 23, Fig. 4, in said upright flange 20 and said frame rail 1 respectively. The holes 22 in the upright flange 20 of the pedestal are elongated, as shown in Fig. 3 of the drawings, to permit of longitudinal horizontal adjustment thereof with respect to the frame rail 1. A tie bar 24, Figs. 2 and 3 of the drawings, extends between the lower ends of the two pedestals 17 on each side of the truck, to further strengthen the same. Said tie bar is secured to the pedestals by means of suitable bolts or screws 25, extending through holes 26 in the tie bar, and said holes 26 are elongated, to permit of relative adjustment of the pedestals.

Adjusting screws 27, Fig. 2 of the drawings, are carried in suitably formed brackets 28 secured to the frame rails 1 on either side of each pedestal 17, and bear against lugs 29 extending laterally therefrom. Thus, when the bolts 21 and 25 are loosened, the pedestals may be moved longitudinally with respect to the frame rails 1 to move the axles nearer to or farther away from the sprocket shaft 4, to provide the proper tension upon the driving chains 9 and 10, and may then be clamped in such position by means of said bolts 21 and 25. The brake shoes 30, shown as suspended by means of relatively long links 31, are not hindered from properly functioning by this limited and relatively slight fore and aft movement of the axles.

A resilient cushion 32, Fig. 4 of the drawings, preferably formed of rubber or other similar material, is interposed between the weight-supporting seat 19 of the pedestal 17 and the frame rail 1, to assist in absorbing the vibrations of said pedestal and to minimize the transmission thereof to the frame and body of the car.

The invention has been described and illustrated herein in its preferred form. Changes may be made, however, in the form and construction of the device, without departing from the spirit of the invention, which resides broadly in a driving truck for railway cars capable of being adjusted to compensate for wear in the driving mechanism, and it is therefore our wish to claim the invention as broadly as the art will permit.

Having thus described our invention, what we claim as new and desire to protect by Letters Patent is:—

1. A driving truck for railway cars comprising a frame, a pair of oppositely disposed pedestals adjustably mounted thereon, means for adjusting said pedestals longitudinally of said frame, resilient cushions interposed between said pedestals and said frame, a supporting and driving axle carried by said pedestals, rail-running wheels fixed to said axle, driving means mounted upon said frame, and power transmitting devices between said driving means and said axle.

2. In a railway car truck, a frame, a pair of oppositely disposed axle carrying pedestals mounted thereon, resilient cushions interposed between said pedestals and said frame, and means for shifting said pedestals longitudinally of said frame.

3. In a railway car truck, a frame, a pair of oppositely disposed axle carrying pedestals shiftably mounted thereon, a bracket fixed to said frame on each side of each pedestal, and adjusting means carried by said brackets for shifting said pedestals longitudinally of said frame.

4. In a railway car truck, a frame, a pair of oppositely disposed pedestals mounted thereon, an axle provided with rail-running wheels carried by said pedestals, a bracket fixed to said frame on each side of each pedestal, a brake shoe pivotally suspended from each bracket and adapted to engage one of said rail-running wheels, and adjusting means carried by said brake-supporting brackets for shifting said pedestals longitudinally of said frame.

5. A driving truck for railway cars comprising a frame, driving means carried thereby, a pair of oppositely disposed pedestals mounted thereon, an axle provided with rail-running wheels carried by said pedestals, a bracket fixed to said frame on each side of each pedestal, a brake shoe pivotally suspended from each bracket and adapted to engage one of said rail-running wheels, adjusting means carried by said brake-supporting brackets for shifting said pedestals longitudinally of said frame, and a power transmitting connection between said driving means and said axle.

6. A driving truck for railway cars comprising a frame, driving means carried thereby, a pair of oppositely disposed pedestals mounted thereon, an axle provided with rail-running wheels and a driving sprocket carried by said pedestals, resilient cushions interposed between said pedestals and said frame, a bracket fixed to said frame on each side of each pedestal, a brake shoe pivotally suspended from each bracket and adapted to engage one of said rail-running wheels, adjusting means carried by said brake-supporting brackets for shifting said pedestals longitudinally of said frame, and a driving chain connecting said driving means with the sprocket on said axle.

7. An adjustable pedestal for railway car trucks comprising a lower bifurcated portion adapted to receive a journal-box, a lateral flange adapted to support a frame member, and an upwardly extended flange provided with slots and adapted to be adjustably secured to the face of said frame.

8. An adjustable pedestal for railway car trucks comprising a lower slotted portion adapted to receive a journal-box, a lateral flange adapted to support a frame member, an upwardly extended flange provided with slots and adapted to be adjustably secured to the face of said frame, and laterally projecting lugs on the front and rear of said pedestal for engagement with adjusting means, whereby said pedestal may be shifted longitudinally of said frame.

In testimony whereof we have signed our names to this specification in the presence of two subscribing witnesses.

WILLIAM H. BUCKINGHAM.
HAROLD S. JOHNSON.

Witnesses:
R. A. ACKER,
D. B. RICHARDS.